(12) United States Patent
Salmi

(10) Patent No.: US 7,729,301 B2
(45) Date of Patent: *Jun. 1, 2010

(54) FILTERING OF ELECTRONIC INFORMATION TO BE TRANSFERRED TO A TERMINAL

(75) Inventor: Matti Salmi, Tampere (FI)

(73) Assignee: Nokia Corporation, Espoo (FI)

( * ) Notice: Subject to any disclaimer, the term of this patent is extended or adjusted under 35 U.S.C. 154(b) by 1310 days.

This patent is subject to a terminal disclaimer.

(21) Appl. No.: 11/189,466

(22) Filed: Jul. 26, 2005

(65) Prior Publication Data

US 2005/0259604 A1    Nov. 24, 2005

Related U.S. Application Data

(63) Continuation of application No. 09/727,560, filed on Dec. 1, 2000, now Pat. No. 6,947,396.

(30) Foreign Application Priority Data

Dec. 3, 1999    (FI)    ................................ 19992617

(51) Int. Cl.
*G06F 15/16*    (2006.01)
(52) U.S. Cl. ....................... 370/310; 370/401; 455/466; 709/206
(58) Field of Classification Search ................. 370/310, 370/401, 477; 455/466; 709/206
See application file for complete search history.

(56) References Cited

U.S. PATENT DOCUMENTS

| 5,806,000 A | 9/1998 | Vo et al. ..................... 455/466 |
|---|---|---|
| 5,873,043 A | 2/1999 | Comer ........................ 455/458 |
| 6,055,442 A | 4/2000 | Dietrich ...................... 455/558 |

(Continued)

FOREIGN PATENT DOCUMENTS

JP    01-119174    5/1989

(Continued)

OTHER PUBLICATIONS

Notice of Reasons for Rejection, Japanese Patent Application No. 2001-541322, drafted May 23, 2008.

(Continued)

*Primary Examiner*—Min Jung
(74) *Attorney, Agent, or Firm*—Perman & Green LLP

(57) ABSTRACT

The object of the invention is a system, a device, a terminal and a method for filtering electronic information to be transferred to the terminal through a telecommunication connection. The invention comprises attaching a specific filtering parameter (30-32) by the device transferring the electronic information to the electronic information for the purpose of filtering before the electronic information is transferred to the terminal through the telecommunication connection, and informing the terminal of said filtering parameter (30-32) before the electronic information is transferred to the terminal through the telecommunication connection. In the terminal, the steps comprise checking said informed filtering parameter (30-32) and allowing or preventing the receiving of the electronic information on the basis of said filtering parameter (30-32). In response to said allowing of the receiving, the electronic information is transferred to the terminal through the telecommunication connection, and in response to said preventing of the receiving, the electronic information is not transferred to the terminal through the telecommunication connection.

22 Claims, 4 Drawing Sheets

U.S. PATENT DOCUMENTS

| | | | |
|---|---|---|---|
| 6,072,942 A | 6/2000 | Stockwell et al. | 395/200 |
| 6,085,099 A | 7/2000 | Ritter et al. | 455/466 |
| 6,101,393 A | 8/2000 | Alperovich et al. | 455/466 |
| 6,101,531 A * | 8/2000 | Eggleston et al. | 709/206 |
| 6,157,630 A * | 12/2000 | Adler et al. | 370/338 |
| 6,175,743 B1 | 1/2001 | Alperovich et al. | 455/466 |
| 6,311,069 B1 | 10/2001 | Havinis et al. | 455/456 |
| 6,332,164 B1 | 12/2001 | Jain | 709/235 |
| 6,367,014 B1 | 4/2002 | Proust et al. | 713/182 |
| 6,421,707 B1 | 7/2002 | Miller et al. | 709/206 |
| 6,421,709 B1 | 7/2002 | McCormick et al. | 709/206 |
| 6,463,464 B1 | 10/2002 | Lazaridis et al. | 709/207 |
| 6,484,197 B1 | 11/2002 | Donohue | 709/206 |
| 6,507,866 B1 | 1/2003 | Barchi | 709/207 |
| 6,539,385 B1 | 3/2003 | Pollack et al. | 707/10 |
| 6,571,275 B1 | 5/2003 | Dong et al. | 709/209 |
| 6,873,850 B2 * | 3/2005 | Dowling et al. | 455/456.1 |
| 6,947,396 B1 * | 9/2005 | Salmi | 370/310 |
| 7,215,947 B2 * | 5/2007 | Dowling et al. | 455/414.2 |
| 2004/0058673 A1 * | 3/2004 | Irlam et al. | 455/412.1 |

FOREIGN PATENT DOCUMENTS

WO    WO 99/27726    6/1999

OTHER PUBLICATIONS

Akio Kokubu, Next-generation Rating/Filtering System on the Internet, IPSJ S IG Notes, vol. 99, No. 83, Japan, Information Processing Society of Japan, Oct. 9, 1999, pp. 9-14.

Kinzo Aiba, Filtering to Block Harmful Information, Nikkei Business Publications, Inc., Apr. 22, 1999, No. 22, p. 47.

* cited by examiner

FILTERING OF ELECTRONIC INFORMATION TO BE TRANSFERRED TO A TERMINAL

CROSS-REFERENCE TO RELATED APPLICATIONS

This application is a continuation of and claims priority from U.S. patent application Ser. No. 09/727,560, filed on Dec. 1, 2000 now U.S. Pat. No. 6,947,396.

FIELD OF THE INVENTION

The present invention relates to the filtering of electronic information to be transferred to a terminal. In particular, but not necessarily, the invention relates to filtering according to the push principle in messaging to a wireless terminal.

BACKGROUND OF THE INVENTION

In digital mobile telephone systems, such as in the GSM system, it is possible to send short text messages: so-called short messages. In the GSM system, this is known by the name of Short Message Service (SMS). Thus, in addition to calls and data transfer, the GSM system provides in the form of a short message service a two-way paging system-like service.

The advantage of short messages compared to calls is that they can be delivered to a receiver although the receiver could not be contacted precisely at the time of transmission. This is implemented by dividing the transmission of a short message from one mobile station to another into two parts. First, from a transmitting mobile station (or e.g. a computer) to a Short Message Service Centre (SM-SC), where the short message is stored and transmitted further to the actual destiny, i.e. to a receiving mobile station when it can be contacted. Short message communication is not connection oriented but connectionless communication, i.e. there, no connection is first established between a transmitting device and a receiving device but, in a short message service, messages are transferred by pushing the messages stored in a specific short message service centre, addressed to a wireless terminal, to the receiving terminal as soon as the wireless terminal can be reached. Thus, it can be said that the short message service centre delivers a short message to a mobile station using a connectionless push method.

Short message communications have proved extremely popular and in Finland, even as much as 10% of the turnover of one operator comes from short messages. Due to the popularity of short message communications, other corresponding communication services, wherein a message is transferred almost in real time to a receiver have been started to be developed. One such new form of communication is picture messaging in the Nokia 3210 phone, where a picture is, however, transferred in a short message. Picture messaging enables the transmitting of a graphic picture message of the size of 72*28 pixels from a computer or a mobile station to another mobile station. Furthermore, in a picture message, there can further be 120 ASCII characters of text at a maximum. In addition, with a Nokia 9110 Communicator, it is possible to transmit and receive an electronic business card containing a JPEG picture. The transmission is effected as a plurality of concatenated short messages.

Further, a multimedia messaging service is being developed for a wireless mobile network, where it would be possible to transmit messages containing multimedia components, i.e. besides pictures and text that are in an electronic format (e.g. in JPEG and GIF format) also short video clips (e.g. in MPEG format) and audio clips (e.g. in MP3 format). In addition, a multimedia messaging service would enable/is expected to enable the transmitting and receiving of files that require a wider bandwidth, such as big image or data files. The intention is also to implement the multimedia messaging service in a manner similar to the short message service by using the push principle, where a message is delivered to a receiving device as soon as it can be reached. For example, WAP communication (Wireless Application Protocol) can be used as a bearer or, in future systems, a mobile communication system of the third generation.

These types of communication services that act on the push principle have specific problems. Namely, e.g. the transmission of a short message is effected as follows:

1) A sender writes with his terminal a message, e.g. "Hi, John. Let's meet in the café that is the first one from the railway station towards the ski resort. It is at the corner. Tom"
2) The sender selects the telephone number of a receiver and sends the message.
3) Within a few seconds, the terminal of the receiver typically informs of the arrived message, e.g. by peeping, and the message "Text Message Arrived" appears on the display of the terminal.
4) The receiver presses the "Read" key, whereupon the message in question will be displayed on the display of the receiving terminal.

Because messages are delivered according to the push principle, they come directly to a receiver without the receiver being asked, and they will be displayed on the display of the receiver's device as soon as the "Read" key is pressed. This has resulted in that also undesirable messages come to the receiver, e.g. advertisements and other non-subscribed information, as well as e.g. messages of adult services. In multimedia communication, the receiving of undesirable messages may be more offensive than undesirable short messages due to multimedia components being included in the message, such as still pictures, video an audio clips. Therefore, in some countries, it is forbidden to advertise services with the help of short messages. On the other hand, if the content of short messages could be controlled advertising would indeed benefit consumers. A consumer could, for example, get calls or the right of use of some messaging service free of charge provided that he also agrees to receive advertisements.

Similar problems may just as well be encountered in the receiving of messages or other electronic information arriving according to the pull principle. A terminal may, effected by a user, for example, download a file from some server (e.g. a web server or WAP server) without exactly knowing what the file contains. In this case, the user downloads the electronic information consciously, but may nevertheless get undesirable information.

Furthermore, multimedia messages in particular are large in size, whereupon delivering them to a terminal is slow and consumes a lot of airtime. In addition, the receiving of a multimedia message requires a lot of processing of the receiving terminal, whereupon receiving consumes a lot of current. Wireless terminals normally operate by a chargeable battery and the current consumption is minimised as far as possible, because the operating time of a battery is an important criterion for the user of a terminal. Hence, the receiving of unnecessary, undesirable messages also results in additional current consumption, which will more quickly lead to the running down of the battery. The battery's operating time is particularly critical in small-sized hand-held terminals, such as mobile phones, which by reason of their size and weight have a small battery. Also for this reason, it would be good that the receiving of undesirable messages, particularly for wireless battery-operated terminals, could be prevented or at least controlled.

SUMMARY OF THE INVENTION

Now, a method, a system, a device and a terminal have been invented for filtering electronic information in transferring electronic information to a terminal, preferably to a wireless terminal. Before the transmission, a specific parameter intended for filtering is attached to electronic information, with the help of which the electronic information is classified before it is delivered to a wireless terminal, and a receiving terminal is first informed of said parameter. On the basis of the parameter, the terminal either allows or prevents the receiving of said electronic information. Preferably, the parameter is transmitted to the terminal in a separate notification message before the sending of the electronic information (which will be carried out after this only if the terminal informs that it will allow its receiving), but alternatively the parameter is included in the first part of the message, such as the header information, which the terminal first reads (i.e. is informed of the parameter before the receiving of the actual content) and may, thus, leave the base part of the message un-received, wherein the actual electronic content is if it turns out, on the basis of the parameter in the header that receiving will be prevented. The receiving terminal may carry out the filtering (i.e. preventing or allowing of the receiving) automatically on the basis of the pre-setting made therein. Alternatively, filtering may be effected so that when the terminal receives the notification message, it tells the user of the parameter (e.g. on the display) who then has an opportunity to either accept or reject with the user interface the receiving of the electronic information. Thus, the terminal only receives specific electronic information, such as specific messages, whereas it rejects the prevented messages and does not even begin to receive them. With this procedure, unnecessary current consumption will be avoided that would be consumed for processing unnecessary messages if the terminal first received the messages and only after this examined whether it will be displayed to the user or whether the message will be removed. Likewise, transferring data in mobile communication networks is expensive, whereupon with the help of the invention unnecessary expenses will be avoided and the capacity of a network will be saved by avoiding the transfer of unnecessary messages over the radio path. Thus, a method wherein filtering would be carried out by examining the entire content of electronic information would be poorly suitable for wireless terminals, because then the whole message would have to be received first, which would cause additional processing and, thus, current consumption in the terminal.

The electronic information to be transferred can be any electronic content, such as messages, files, etc. The electronic information can be any information, preferably delivered using the push principle, such as short messages, picture messages and multimedia messages. The electronic information can also be information delivered using the pull principle, such as a file downloaded from some server or information in a server, whereto a connection is consciously established from a terminal.

In a preferred embodiment of the invention, electronic information, such as multimedia messages are always classified before the transmission, i.e. a classification parameter that acts as a filtering parameter is attached to them. The classification is carried out by the transmitting device, such as a server wherein the electronic information is stored or a gateway through which the electronic information passes before it is delivered to a wireless terminal. Correspondingly, if a message is transmitted from another terminal, the attaching of said parameter is automatically carried out by the transmitting terminal. Thus, the user cannot add to and select for the message to be transmitted the parameter to be attached to the message, but this is automatically carried out by the transmitting device (e.g. a terminal). Thus, the user can neither add nor change the parameter. It can be said that the system takes care of the classification of the electronic information. Hence, each device, such as a terminal, a server or a gateway, contains in advance the classification rules on the basis of which the parameter that denotes the classification (as well as possible other parameters that denote, e.g. the sender, the service provider or the service content) will be automatically added to each electronic information transmitted from the device. Preferably, the rules in question are stored safely (encrypted) in each device so that no individual user can manipulate them.

According to a first aspect of the invention, there is implemented a filtering method for filtering electronic information to be transferred to a terminal through a telecommunication connection, which method is characterised in that it comprises the steps, wherein a specific filtering parameter is attached by a device transferring the electronic information to the electronic information for the purpose of filtering before the electronic information is transferred to the terminal through the telecommunication connection; and the steps of informing the terminal of said filtering parameter before the electronic information is transferred to the terminal through the telecommunication connection;

checking in the terminal said informed filtering parameter and allowing or preventing the receiving of the electronic information on the basis of said filtering parameter, whereupon in response to said allowing of the receiving, the electronic information is transferred to the terminal through the telecommunication connection;

in response to said preventing of the receiving, the electronic information is not transferred to the terminal through the telecommunication connection.

By the attribute telecommunication connection is meant a telecommunication connection that can be implemented either as a connection oriented or connectionless service. In connection oriented contacting, a given connection link is first established between the communicating parties before actual data transmission can be effected. An example of this is, e.g. a data call in a cellular network. In connectionless contacting, no connection link needs to be established, but data transmission can be effected immediately. Furthermore, in connectionless data transmission, such as UDP (User Datagram Protocol) in the Internet network, the route to be used for the transmission of data is not determined in advance.

As for the adding of a parameter, here by the transferring device is meant either the device that created the electronic information (e.g. a terminal or a server), where the electronic information originates from, i.e. which transmits the electronic information to the terminal either directly or through a server or the device that processes the electronic information (preferably a server), which processes. i.e. through which the message passes (e.g. as in store-and-forward messaging) before it is delivered to the receiving terminal.

According to a second aspect of the invention, there is implemented a terminal comprising means for establishing a telecommunication connection and for receiving electronic information through the telecommunication connection and it is characteristic of the terminal that it comprises means for receiving a filtering parameter which filtering parameter is related to the electronic information to be received, means for allowing or preventing the receiving of the electronic information on the basis of said filtering parameter and that the terminal is arranged not to receive the electronic information through the telecommunication connection when the filtering parameter denotes the electronic information being prevented.

The terminal here can be any terminal, such as a mobile station or a computer terminal that communicates with a telecommunication network. Preferably, the terminal is a wireless battery-operated terminal and the communication is effected over a radio interface. In a preferred embodiment of the invention, the terminal is a mobile station of a cellular network and, particularly, a wireless WAP terminal that uses WAP protocol for external communication.

According to a third aspect of the invention, there is implemented a system for filtering electronic information to be transferred to a terminal through a telecommunication connection, which system comprises a device for transferring the electronic information and a terminal for receiving the electronic information, and it is characteristic of the system that it comprises means for attaching a specific filtering parameter to the electronic information for the purpose of filtering before the electronic information is transferred to the terminal through the telecommunication connection;

means for informing the terminal of said filtering parameter before the electronic information is transferred to the terminal through the telecommunication connection, and that said terminal comprises means for checking said informed filtering parameter and for allowing or preventing the receiving of the electronic information on the basis of said filtering parameter, and that in response to said allowing of the receiving, the electronic information is transferred from said device to the terminal through the telecommunication connection;

in response to said preventing of the receiving, the electronic information is not transferred from said device to the terminal through the telecommunication connection.

In a preferred embodiment of the invention, the service is multimedia messaging where multimedia messages are transferred to a terminal, preferably to wireless terminals. The multimedia messages may comprise one or more multimedia components, such as, for example, text, sound, images or video picture. The multimedia messaging service according to this embodiment is preferably implemented so that a server is in communication with a telecommunication network through which server the multimedia messages pass and which first transmits to the receiving terminal a notification message which contains the parameter to be used in filtering. If the terminal accepts the message on the basis of the parameter, i.e. allows its receiving, the server will send the multimedia message to the terminal (or the terminal will retrieve the message from the server). If the terminal rejects the message, i.e. prevents its receiving, the server will not try to send the message to the terminal.

With the help of the invention, the user of the terminal can regulate what electronic information he receivers and can at least to some extent avoid or control the receiving of undesirable information. Preferably, all electronic information coming to the terminal goes through a server, which controls that all electronic information contains a filtering parameter.

According to a fourth aspect of the invention, there is implemented a device for transferring electronic information through a telecommunication connection to a terminal, and it is characteristic of the device that it comprises means for attaching a specific filtering parameter to the electronic information for the purpose of filtering before the electronic information is transferred to the terminal through the telecommunication connection, which filtering parameter is intended to allow the terminal either to prevent or allow the receiving of the electronic information over the telecommunication connection on the basis of said filtering parameter.

In one preferred embodiment of the invention, the messages to be transmitted are classified into three main classes depending on whether they are originally i) personal, such as from another terminal, ii) commercial advertisements or iii) other information, typically subject-specific information containing information relating to some subject, such as weather information, stock exchange information, news, etc. This being the case, one of these main classes can be as the primary parameter. In addition, some more specific subclass and/or ID information related to the sender of the message can be as secondary parameters.

BRIEF DESCRIPTION OF THE DRAWINGS

In the following, the invention will be described in detail by referring to the enclosed drawing, in which.

DETAILED DESCRIPTION

In the following, the invention will be described by way of example using WAP communication as an exemplary application environment. WAP technology enables the supplying of advanced Internet services into digital mobile stations of wireless communication networks. WAP is an open standard designed to globally support the majority of digital wireless communication networks, such as GSM (Global System for Mobile Communications), GPRS (General Packet Radio Service), PDC (Personal Digital Cellular), CDMA IS-95 (Code Division Multiple Access), TDMA IS-136 (Time Division Multiple Access) and networks of the third generation, such as WCDMA (Wideband CDMA) and CDMA-2000. Because the WAP system was developed only recently and because the WAP system specifications in some cases only determine the frameworks for different implementations, there exist no known solutions for the implementation of given functions of the WAP system.

Figure 1:
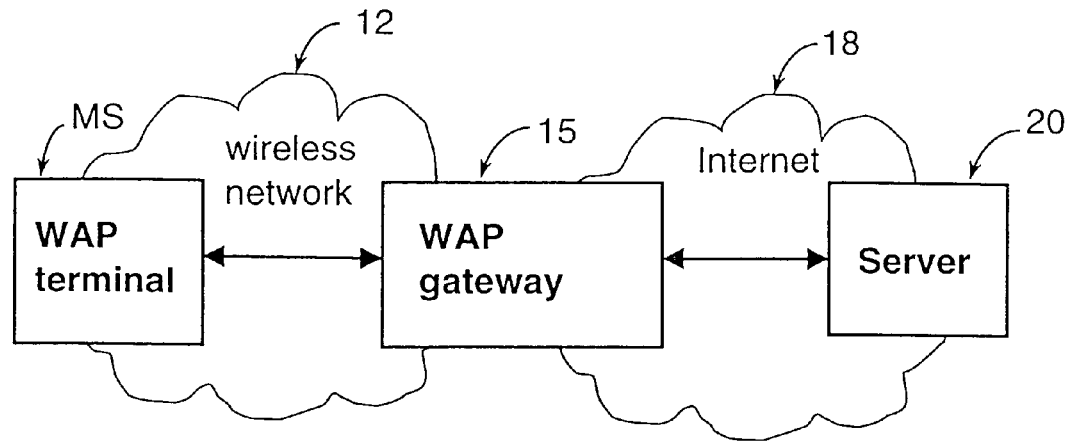
FIG. 1 shows a model of the WAP system.

In the WAP system shown in FIG. 1, a wireless terminal, mobile station MS, here a so-called WAP terminal that uses WAP protocol for external communication can communicate with a server 20 of the Internet network. The connection between the WAP terminal and the Internet network is implemented by a WAP gateway 15 that acts as a messaging element between the WAP terminal MS and an Internet network 18. The WAP gateway 15 converts when necessary messages directed by the WAP terminal MS to the Internet network 18 into messages according to some Internet protocol, such as TCP/IP protocol (Transmission Control Protocol/Internet Protocol). Correspondingly, messages addressed from the Internet network 18 to a wireless network 12, for the WAP terminal MS, are converted when necessary in the WAP gateway 15 into messages according to WAP protocol (e.g. WSP, Wireless Session Protocol). The WAP terminal MS as such can be any device that uses WAP protocol for external communication, such as a mobile station of a cellular network or a computer terminal that is in communication with the wireless network 12, e.g. through a mobile station of a cellular network.

Communication modes supported by WAP, intended for information transfer over the radio path are called bearers. These are, among others, in the different networks supported by WAP short messages (SM), data calls (CSD, Circuit Switched Data) and packet radio, i.e. GPRS services, USSD service (Unstructured Supplementary Service Data), as well as other bearers determined in the WAP specifications.

As for its protocols, the WAP system is a hierarchic system. Both a WAP terminal and a WAP gateway comprise a programmably implemented WAP protocol stack that comprises specific WAP protocol layers. WAP protocol layers are, among others, a WSP layer (Wireless Session Protocol), a WTP layer (Wireless Transaction Protocol) and a WDP layer (Wireless Datagram Protocol). The corresponding WAP protocol layers of a WAP terminal and a WAP gateway communicate with each other for implementing reliable data transfer between the WAP terminal and the WAP gateway over a specific bearer. WAP architecture and protocol layers are determined in more detail in the WAP specifications, which can be found at the address of http://www.wapforum.org.

In WAP communication, a session is established between a wireless terminal and a WAP gateway during which there are a great deal of interaction and many transactions between the terminal and the WAP gateway. The transactions are primarily messages transmitted between the terminal and the gateway and they can be either of push type or of pull type. Typically, the messages are transmitted as so-called datagrams.

Datagrams are determined in more detail in the WAP WDP specification and data units according to the WSP specification are correspondingly determined in more detail in the WAP WSP specification. For example, in the WAP WSP specification, the protocol data units Post and Reply used for transmitting an interrogation from a terminal to a server and, correspondingly, for transmitting a reply from the server to the terminal are determined in more detail. Both data units have specific fields, such as headers of the size of a few octets, i.e. bytes, which may contain different types of header information and a data field of the size of several octets that contains the actual information.

The following table 1 shows an example of what type of information there could be in the headers of a data unit when, for example, a multimedia message would be transmitted according to WAP protocol.

TABLE 1

Fields of Headers.

| | Name of Field | Content of Field | Comments |
|---|---|---|---|
| 1. | Message Class | Personal/ Advertisement/ Informative | Default: Personal |
| 2. | Priority | Ordinary/ Urgent | Default: Ordinary |
| 3. | Subject | Message subject | May also be omitted |
| 4. | To whom | Address of recipient | Telephone number or other address of recipient (e.g. e-mail) |
| 5. | Content information of message | Tells what the message contains | Tells the types of the files (e.g. JPEG, GIF, MPEG, WAV). |
| 6. | From whom | Address of sender | An address added by a messaging service centre to prevent misuse |

Thus, as one field the headers have the classification data of a message according to the invention in the field Message Class, which in a preferred embodiment can be i) Personal ii) Advertisement or iii) Informative and which thus tells that the message is either i) personal, i.e. either personal information originating from a server or a message originating from another terminal (subscriber connection), ii) an advertisement message typically containing commercial advertisement information or iii) an informative message containing information related to some subject, such as weather information, stock exchange information, news, etc.

These classes can further be divided in more detail into subclasses, which in the following will be described by way of example.

Main class i) Personal is further divided into subclasses:

i.1) Mobile Origin Personal, which has further the subclasses i1.1) From Terminal i1.2) From Interface i.2) Non-subscribed Personal Content i.3) Subscribed Personal Content The use of these subclasses is as follows. The main class "Personal" is intended for personal communication, as well as for the content service that is only intended for personal use. The first subclass i.1 "Mobile Origin Personal" is a class used for transmitting messages from a terminal. The second-level subclass therein i.1.1 "From Terminal" means that typically the message is formed by the user. This may, in the case of a multimedia message, be a digital photograph taken by the user with a terminal, whereto the user has added text in a manner shown in FIG. 5. Instead, the second-level subclass i.1.2 "From Interface" is given to the messages that come, e.g. from another device (such as a computer) that is connected to a mobile station through an external connection (e.g. a cable, infrared or short range rf connection). The purpose of this subclass is to avoid circumventing the class marking, for example, so that if someone connected a computer (a server) to a wireless terminal and transmitted information through the terminal to other terminals (and not directly from the server). In this case, however, the terminal will add to a message the class "From Interface", whereupon the receiving terminal may prevent the receiving of messages that belong to the class in question.

The second first-level subclass i.2 "Non-subscribed Personal Content" and the third first-level subclass i.3 "Subscribed Personal Content" are intended for personal information, such as an account statement from the bank, a copy of a bank receipt or an airline ticket or an equivalent, which has either been subscribed to (class i.2) or comes from the bank without subscribing.

The main class ii) Advertisement is further divided into subclasses:
- ii.1) Service Package Advertisement (Subscribed)
- ii.2) Non-subscribed Advertisement
    - ii.2.1) Local Advertisement
    - ii.2.2) City Advertisement
    - ii.2.3) National Advertisement
    - ii.2.4) International Advertisement The use of these subclasses is as follows. The main class "Advertisement" is intended for commercial advertisements. The main class is divided into two first-level subclasses, "Service Package Advertisement" and "Non-subscribed Advertisement". The first-level subclass "Service Package Advertisement" is for the advertisements that are part of a service package subscribed by the user. Thus, the user may get the service package in question free of charge or at a major discount against agreeing at the same time to receive advertisements through the service provider in question. Thus, if the user prevents with the terminal the receiving of such advertisements, the service may be interrupted or cancelled. The first-level subclass "Non-subscribed Advertisement" is for those advertisements that the user has not subscribed to but which otherwise may be interesting. For these advertisements there is further four second-level subclasses of which "Local Advertisement" contains advertisements that are related to the user's immediate location, e.g. relating to a specific sector of a town. This may be fixed, e.g. the home location informed by the user or there may be means (such as a GPS device) in the network or terminal for determining the location of the terminal. The subclass "City Advertisement" is for advertisements that can be reached, e.g. by public means of transport, car or bicycle, typically, e.g. within one and the same city. The subclass "National Advertisement" is for services that cover a country, which may also be obtained locally but typically, for example, in different parts of the country. The subclass "International Advertisement" is for international services, for example, job advertisements of vacancies abroad or language courses abroad, etc.

All messages belonging to said four second-level subclasses that belong to the first subclass "Non-subscribed Advertisement" can be rejected, in which case the terminal will not receive the message.

The main class iii) Informative is further divided into subclasses:
- iii.1) Emergency Information
    - iii.1.1) Immediate Action Required
    - iii.1.2) Action Required
    - iii.1.3) Plain Information
- iii.2) Subscribed Information
- iii.3) Non-subscribed Information The use of these subclasses is as follows. The main class "Informative" is intended for informative services that normally are transaction oriented. The first-level subclass "Emergency Information" is for emergency situations. It further has three second-level subclasses of which the subclass "Immediate Action Required" is for emergency messages where the user should take action immediately. The terminal communicates this information to the user. An example could be informing of immediate evacuation, e.g. due to a dangerous chemical leakage or a state of war. The subclass "Action Required" is for emergency messages where there is, for example, no immediate danger to life but where the user should nevertheless take action. An example could be the approach of a dangerous storm (with a few days' warning time). The subclass "Plain Information" may be related to emergency situations where there is a need to send the user information but which does not necessarily require action. An example of this could be the message "All Clear!" or the message "The direction of the storm has changed, passing 100 km further in the north" or something similar. The terminal is programmed so that only the receiving of messages that belong to the subclass "Plain Information" can be prevented by the terminal and messages that belong to the two first mentioned subclasses will be delivered without being prevented by the terminal. Thus, the subclasses of these first mentioned ones and the main class "Emergency Information" can be used as an authority tool because the terminal is unable to prevent the receiving of messages that belong to that class.

The first-level subclass "Subscribed Information" under the main class "Informative" is for different type of transaction-specific subscribed information, such as news, weather information or forecast, stock exchange prices, sports news, etc. The user can prevent with his terminal the receiving of such information. The first-level subclass "Non-subscribed Information" can be in a manner similar to the subclass "Subscribed Information" for transaction-specific information but which the user has not subscribed to. This could be information transmitted by some voluntary organisation or an equivalent on local events or the weather, etc. and the user can prevent the receiving of this type of information.

Figure 2:
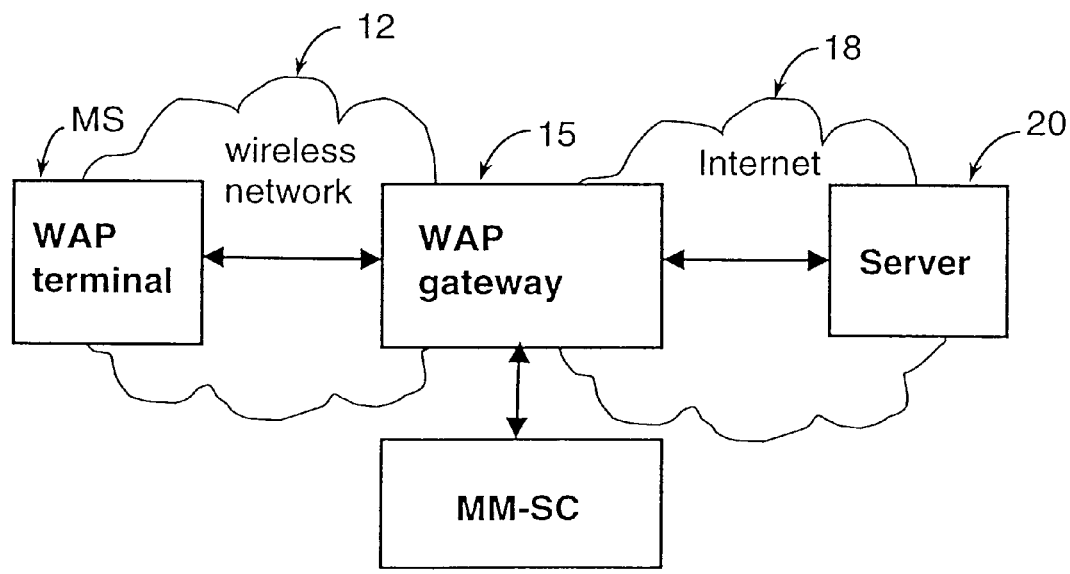
FIG. 2 shows a system according to one embodiment of the invention.

FIG. 2 shows an example of a system for transmitting multimedia messages, which in other respects corresponds to FIG. 1 (and the description will not be repeated here in that respect), but the system further has a multimedia messaging service centre MM-SC, connected to a WAP gateway, which is here used as an example. In an ordinary GSM network, the MM-SC could be connected to a mobile services switching centre (i.e. so-called MSC) and in a GSM GPRS network, the MM-SC could be connected to a support node (i.e. so-called SGSN or GGSN known from GPRS).

An MM-SC is a network element, a server, which can be located, for example, in a cellular network or the Internet network. In a multimedia messaging service, the MM-SC acts as an element that stores in its memory a multimedia message addressed to a wireless terminal MS. In a preferred embodiment of the invention, the MM-SC forwards the multimedia message further to the wireless terminal MS if this allows the receiving of the message and when it can be reached. The messaging mechanism in question is known by the name of store-and-froward messaging. A corresponding arrangement is known in connection with a GSM network's short messages, where the network's Short Message Service Centre SM-SC carries out the store-and-forward messaging of short messages.

The MM-SC communicates with the wireless terminal MS through the WAP gateway 15. Physically, the MM-SC is preferably located in the same Internet network part as the WAP gateway 15. Typically, communication between the MM-SC and the WAP gateway 15 is implemented according to Internet network protocols (IP protocols). These are, e.g. TCP/IP and HTTP 1.1.

When a multimedia message that may contain one or more multimedia components, such as text, pictures, photographs, audio clips or video clips in an electronic format, arrives in the MM-SC, the MM-SC stores it in its memory and sends the wireless terminal MS a notification message as a sign of the stored multimedia message, as well as for informing of the class parameter for filtering.

Figure 3A:
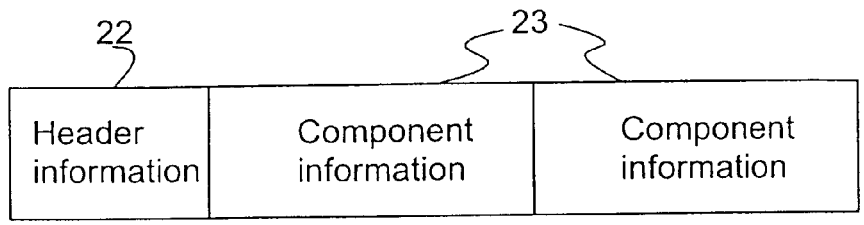
FIG. 3a shows a rough structure of a notification message according to the invention.

In a preferred embodiment of the invention, a notification message is implemented making use of WAP protocol as a message that allows the transmitting of information both in a text format and in a binary format in the same content type. According to WAP specifications, a notification message can be determined both by an Internet compatible text format presentation of XML format (extensible markup language) and by a binary format according to the binary coding of WAP. FIG. 3a shows one possible rough structure of a notification message 21, where the presented notification message 21 comprises a header part "Header Information" 22 and in addition, e.g. fields 23 for denoting the properties (such as the component's type and size) of the multimedia components (which there can be one or more) contained by multimedia messages. The "Header Information" part 22 comprises message class fields according to the invention which denote general information of the multimedia message stored in the MM-SC. Furthermore, the part 22 in question may contain the information on the sender's address and priority.

Figure 3B:
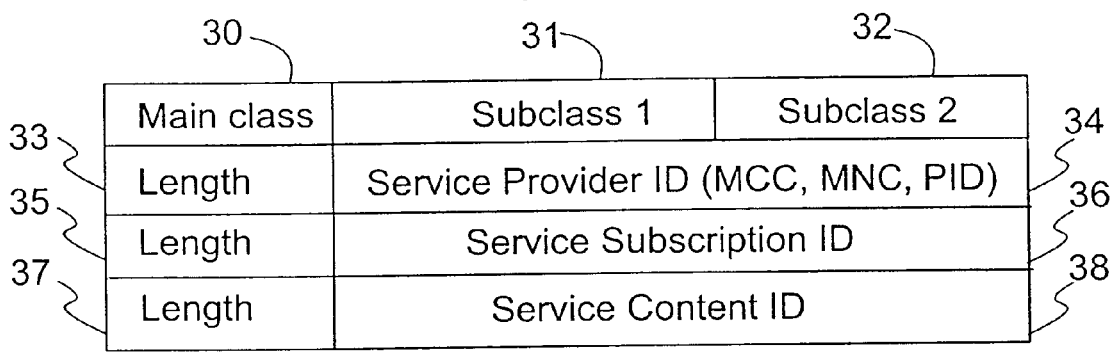
FIG. 3b shows filtering parameters according to one embodiment of the invention.

FIG. 3b shows in more detail the message class fields of the "Header Information" part 22. The content and structure of the fields in FIG. 3b are based on what was already described above. Thus, it has the information 30 on the main class, i.e. the above-mentioned classes i, ii and iii, which can also be presented in numbers, for example, so that 1=Personal, 2=Advertisement and 3=Informative. Hence, for informing of the main class at least two bits are reserved (which is enough for presenting the numbers in question), but preferably a byte, i.e. eight bits. Further, it could be possible to denote by the number 0 in a similar manner the subclass-1 of a field 31 and the subclass-2 of a field 32 that contain the class fields, which according to the class hierarchy presented above inform of the first-level (e.g. i.1) and possibly the second-level subclass (e.g. i.1.1). Because these are in their own fields they can correspondingly be presented as numbers in a consecutive order, whereupon in the subclass-1 there would be 1=Mobile Origin Personal, 2=Non-subscribed Personal Content, . . . , and 7=Subscribed Information, and 8=Non-subscribed Information. In a similar manner, in the subclass-2, there would be 1=From Terminal, 2=From Interface, . . . , 8=Action Required and 9=Plain Information. Also for the fields 31 and 32, one byte can be reserved for each. Further, in the fields 31 and 32, it could be denoted by the number 0 that the subclass is unknown.

Further, there are fields 33 and 34 in FIG. 3b, wherein the field 34 is a Service Provider ID that contains a Mobile Country Code (MCC, normally 3 characters), a Mobile Network Code (MNC, normally 2 characters) and a Provider ID (PID, normally 15 characters at a maximum). The codes MCC and MNC are known from GSM specifications. The field 33 denotes the length of the field 34. In a similar manner, there are fields 35 and 36 of which the field 36 is a Service Subscription ID (15 characters at a maximum) and the field 35 denotes its length. Further, the classification fields contain fields 37 and 38 of which the field 38 is a Service Content ID (15 characters at a maximum) and the field 37 denotes its length.

With reference to FIG. 3a, if a multimedia message is transmitted from another terminal the telephone number of which is +358 40 123456 and the priority is normal and which, e.g. comprises a component of the size of 330 bytes in a text format and a video of the size of 164 kilobytes in an mpeg format, the information of the field 22 and the lines in the notification message 21 in a text format that correspond to the fields 23 may look, e.g. as follows:

Message-Main Class: Personal

Priority: Normal

Sender: +358 40 123456

Message-Component-Type1: text/plain

Message-Component-Size1: 330

Message-Component-Type2: video/mpeg

Message-Component-Size2: 164000 where consequently the three topmost lines are related to the field 22 and the four bottom-most lines to the fields 23.

Preferably, this type of notification message 21 can be transmitted as a WAP message coded in a binary format. Alternatively, the notification message 21 can be delivered to a wireless terminal MS in some other manner commonly known from wireless networks, such as an ordinary short message containing text.

The difference between data in a text format and in a binary format is found in the grouping of the data although all data goes over the radio path in a binary format. Data in a text format is grouped so that a specific code word that is transmitted corresponds to each character or letter. Said code word can be, for example, eight bits long. In transmitting data in a binary format, only individual bits are transmitted, whereupon data transmission capacity is saved.

In a preferred embodiment of the invention, the information contained by the notification message 21 is transmitted in a binary format. Said notification message 21 may go from the MM-SC to the WAP gateway as a message according to IP protocol, e.g. in XML format using the POST command determined in HTTP 1.1 (Hyper Text Transfer Protocol). If the notification message 21 comprises parts in a text format, the WAP gateway will convert said parts into a binary format according to WAP protocol and direct said notification message 21 to the wireless terminal over the radio path using a specific bearer. Said conversion can also already be carried out in the MM-SC. The bearer used for the transfer of the notification message 21 can be, for example, a GSM network's short message service (SMS) or USSD service, which are both so-called connectionless services.

After receiving said notification message 21, the wireless terminal MS makes a decision according to the invention on the retrieving of a multimedia message from the MM-SC, i.e. reads the parameters in the notification message added for filtering and compares them to the terminal's stored settings or requests the user (for specific classes) to give his approval or rejection for the receiving of the multimedia message in question. In case of acceptance, the terminal retrieves the multimedia message from the MM-SC. In case of rejection, the terminal sends the MM-SC a notification that it has rejected the message, whereupon the message will not be delivered to the terminal.

Above, in relation to FIGS. 3a and 3b, a situation was described where according to the invention, the information required for filtering is transmitted to the terminal in a separate notification message before the sending of the actual electronic information content. Alternatively, the terminal reads this information from the transmission of the electronic information by first reading the header part of the transmission and only after that it will receive the base part, i.e. the actual electronic information content, if it allows receiving or it will not receive the base part at all if receiving is prevented (on the basis of filtering). For illustrating this alternative, FIG.

4 shows exemplary electronic information, which here preferably is a multimedia message 40. In this example, the multimedia message is a WAP message and particularly a message according to WSP protocol, which has general WSP headers 41 (which are described in more detail in WSP Specification), a field 42 for the message class information according to the invention (as is shown in FIG. 3b), as well as for possible other header information 43 related to the multimedia message and a message base 44, i.e. the actual electronic information, as in the case of a multimedia message, MPEG-video 45 and text 46. The message class information can be included in electronic information in different ways. There can directly be, e.g. a mere subclass wherein the information has been classified or there can be both a main class and one or more subclasses. Thus, class information may include the information "i) Personal, i.1) Mobile Origin Personal and i.1.1) From Terminal, and preferably the information is divided into fields of their own, in the manner shown in FIG. 3b.

Figure 4:
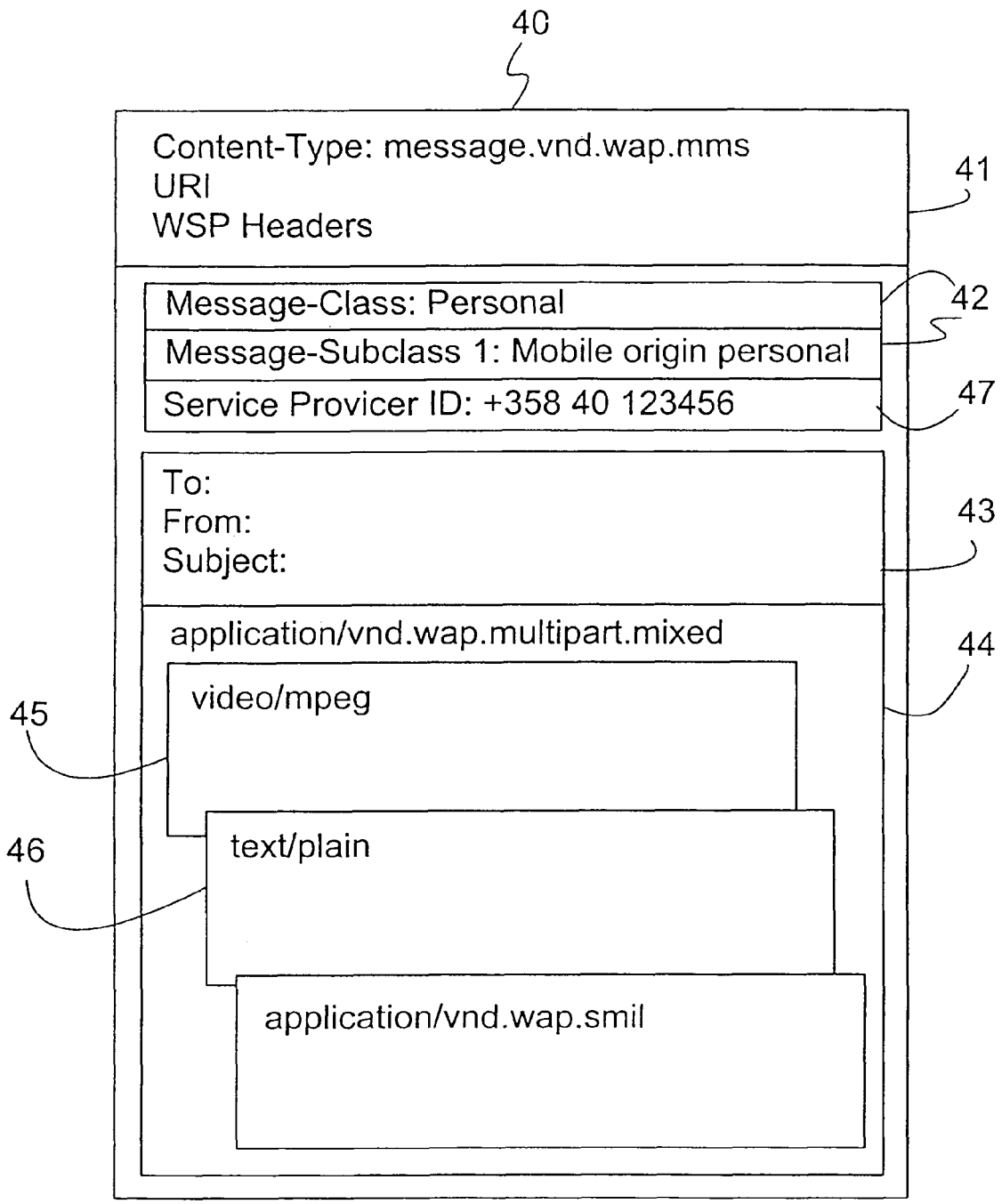
FIG. 4 shows an example of a multimedia message according to the invention.

Preferably, in the header information, in the field 42 in the example shown in FIG. 4, there may further be other information required for the filtering of a message, such as an ID 47 that identifies the source of the message. This ID 47 of the source of the message is preferably also used as a parameter for filtering the electronic information according to the invention. With this second parameter (in addition to the class information) the filtering area can be further specified. Hence, for example, the receiving of messages that belong to a given class can be prevented on the whole, but the receiving of messages can be allowed if the source ID 47 is a specific one. In this way, for example, advertisements can be prevented otherwise except if they come from a specific source. There may be just this kind of need, for example, in connection with a given service package, which may have a related condition to receive specific advertisements in order to obtain the other services of the package.

In "Mobile Origin Personal" messages of the main class i), the service provider ID is usually the telephone number or e-mail address of the terminal that sent the message. This information shows in the header information of the message (in the field 43 in FIG. 4). In messages of the main classes ii) and iii), there is preferably in addition to the class information, some ID of the following type for identifying the source:

a) Service Provider ID (SPID), b) Service Subscription ID (SSID), c) Service Content ID (SCID).

Of these IDs, the ID a), i.e. the Service Provider ID (SPID) identifies the service provider, i.e. corresponds to the field 34 in FIG. 3b. Service providers are registered, e.g. at a mobile network or MM-SC administrator and they are given a specific ID. On the basis of this ID, a receiving terminal can, for example, receive all electronic information originating from a specific server. The ID b), i.e. the Service Subscription ID (SSID) contains a client number that identifies the client and, thus, the client's subscription to the service in question. This ID is in the field 36 in FIG. 3b and it may refer, for example, to a specific service package, whereupon the receiving terminal identifies that the message is related to the subscribed service package. In relation to an advertisement, the SSID can thus be used for informing of a client relationship. The ID c), i.e. the Service Content ID (SCID) is an even more accurate ID, which identifies the content of the message in question, i.e. identifies more accurately what the message originating from a specific service provider contains. This ID is in the field 38 in FIG. 3b. Thus, the ID may, for example, in the case of information messages, tell that the message is weather information. In the exemplary classifications presented here, these IDs SPID (a), SSID (b) and SCID (c) are used so that all the IDs SPID, SSID and SCID are added to messages of the classes i.3, ii.1 and iii.2 and the IDs SPID and SCID are added to messages of the classes i.2, ii.2.1, ii.2.2, ii.2.3, ii.2.4, iii.1.1, iii.1.2, iii.1.3 and iii.3.

The IDs SSID and SCID can be used for identifying the content of a message and, thus, for referring to the message. Hence, if a terminal wants to carry out an interrogation relating to a specific received message (e.g. it wants to inquire of a server MM-SC why the message in question was sent to it) it may refer to the IDs SSID and SCID on the basis of which the server can, for example, advise what to do if one wants to prevent the receiving of the messages in question.

In a preferred embodiment of the invention, the example shown in FIG. 4 of electronic information to be transmitted (here: of a multimedia message) is binary coded before the transmission. Binary coding is known from WAP specifications and it can be carried out, for example, for a message according to WSP protocol in accordance with WAP WSP specifications.

Figure 5:
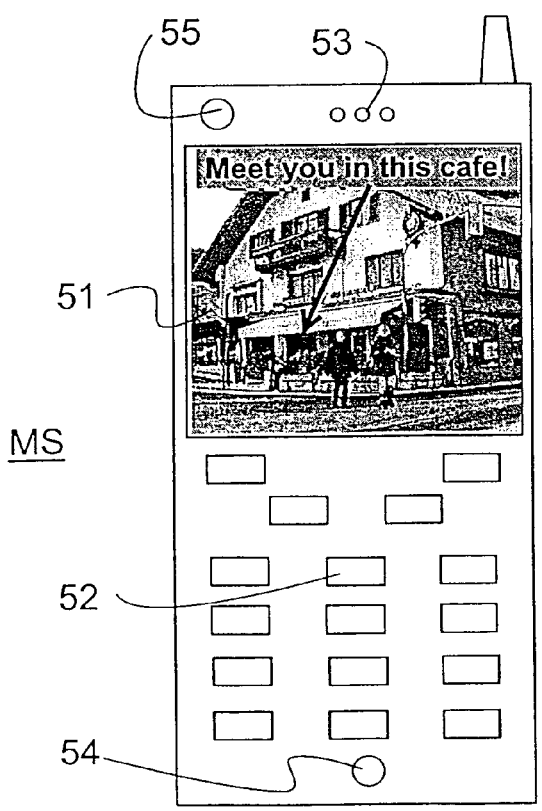
FIG. 5 shows an example of the user interface of a terminal and of a multimedia message.

FIG. 5 shows an example of a wireless terminal MS according to the invention and of its user interface, as well as an exemplary multimedia message on the display of the terminal. Here, the terminal is illustrated as a mobile station MS, as a hand-held mobile phone, which has a display 51, a keyboard 52, a speaker 53 and a microphone 54. In addition, a terminal capable of multimedia communication preferably has a camera 55 for taking still and moving pictures and for sending them over a wireless connection. Alternatively, a picture can be transferred to the wireless terminal MS from a digital camera, e.g. through an IR connection, as is known from a Nokia 9110 Communicator device. On the display 51 of the terminal, there is shown an example where a user takes a photograph of a café where he is going to and adds to it the text "Meet you in this café" and adds to the picture, for example, an arrow found behind the menu commands. After this, the terminal sends the whole package, i.e. the picture, the text and the arrow in a single multimedia message to the receiver. In this case, the message is formed by the terminal, whereupon the terminal (or alternatively, a multimedia messaging service centre MM-SC, on which more information will be provided later) adds to the Message Class field (field 42, field 22 or more precisely field 31) of the headers of the message the class information "From Terminal". The receiving terminal reads the class information in the headers of the incoming multimedia message and possibly the telephone number of the sender and receives the message on the basis of these data (depending on the settings done by the user of the receiving terminal).

Figure 6:
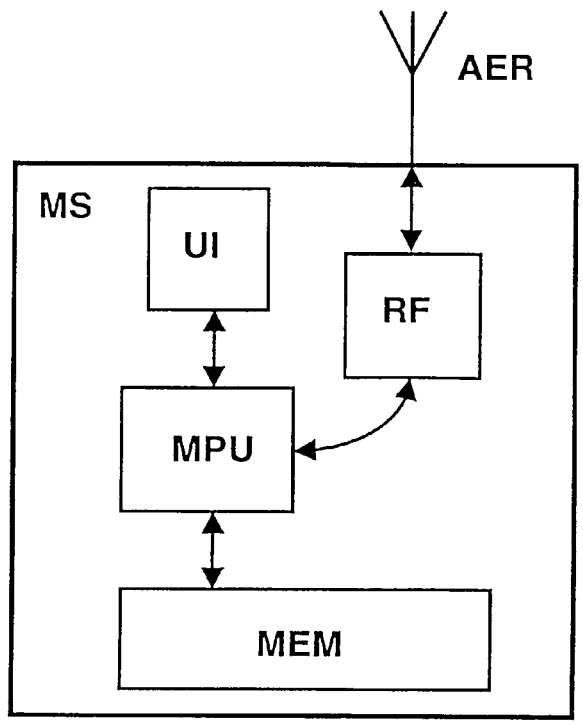
FIG. 6 illustrates as a block diagram essential parts of a mobile station that implements a method according to the invention.

FIG. 6 illustrates parts that are essential for the operation of a wireless terminal that implements a method according to the invention. The wireless terminal MS comprises a processor MPU and parts functionally connected to the processor: a memory MEM; a user interface UI; and radio part RF. The processor MPU is preferably a microprocessor, controller or a digital signal processor (DSP). The memory MEM preferably comprises a non-volatile read only memory (ROM) and a read access memory (RAM). The radio part RF can transmit radio frequency messages, such as messages according to WAP protocol, and receive radio frequency messages, such as multimedia messages, with its antenna AER. The user interface UI preferably provides the user with a display and a keyboard for using the wireless terminal MS.

The software of the wireless terminal MS, also the software related to the implementation of the reading of the headers of a multimedia message is typically stored in the non-volatile memory. The processor MPU controls on the basis of the software the operation of the wireless terminal MS, such as the use of the radio part RF; the presentation of messages by the user interface UI; and the reading of inputs received from the user interface UI. The software that can be implemented in many different ways preferably comprises program blocks that are responsible for the implementation of different procedures. These procedures are, e.g. the reading of the headers and the controlling of the operation of the terminal on the basis of the headers when receiving a multimedia message, the adding of a header (e.g. "Personal" and the subclasses belonging thereto) to the message to be transmitted, the controlling of settings and the controlling of operation on the basis of the settings. Thus, the user may input into the terminal settings in advance as to into which class (subclass) classified messages it is allowed to receive and into which class (subclass) classified messages it rejects, i.e. refuses to receive. This being the case, the terminal preferably first reads the class information in a notification message that comes separately and if the class in question is closed by a setting, no actual message will be received at all, whereupon a saving is effected in current consumption when no unnecessary message processing is carried out. Alternatively, the terminal first reads the class information in the header of the actual transmitted message and if the class in question is closed by a setting, the latter part of the message will not be received at all, whereupon a saving is also effected in current consumption when no unnecessary message processing is carried out. The adding or reading of the header (i.e. class information and possible ID information of the terminal) in the wireless terminal according to the invention is finally carried out by the processor MPU together with the software and memory MEM of the wireless terminal. This is effected automatically and in this respect, the software is encrypted, i.e. protected against manipulation. Thus, the user cannot, for example, with the user interface influence the class information put in a message, but the terminal (i.e. MPU) does it automatically according to whether the message is formed by the user (class i.1.1) or whether it comes to the terminal through an interface from another device (class i.1.2).

Figure 7:
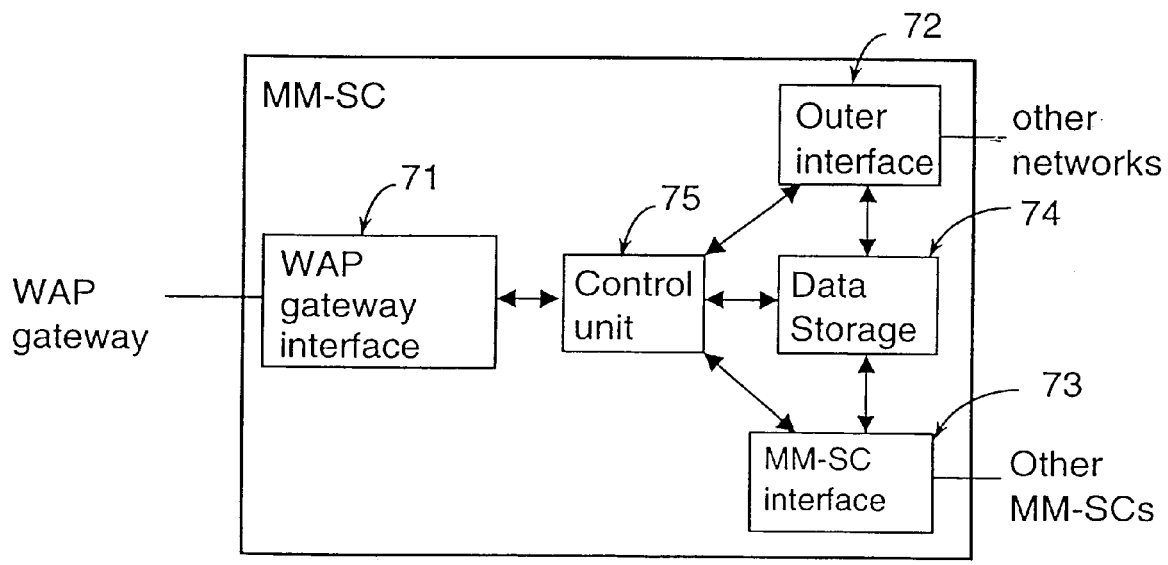
FIG. 7 is a block diagram that illustrates functional blocks of a server that transfers messages according to the invention.

FIG. 7 shows a block diagram, which illustrates functional blocks of a multimedia messaging service centre MM-SC that is in communication with a network, relating to the implementation of the present invention. The multimedia messaging service centre MM-SC is connected, e.g. to the WAP gateway 15 shown in FIG. 1. Alternatively, the MM-SC can, e.g. in a GSM network, be connected to a mobile services switching centre (similar to the manner in which a short message service centre is connected) or in the case of a GPRS network, to the network's so-called support node. The MM-SC comprises a WAP gateway interface 71 through which the MM-SC communicates with the WAP gateway 15. Through an external interface 72, communication is managed to other networks outside the WAP system and through an MM-SC interface 73 to possible other multimedia messaging service centres. A data storage 74 is the database wherein multimedia messages are stored and kept. A control unit 75 controls the operation of the MM-SC.

Multimedia messages addressed to the wireless terminal MS arrive in the MMSC through some interface (71-73) comprised by it, and they are stored in the data storage 74. The message class and possible other filtering parameters, such as the ID of the source, have already been added by the server that transmitted the message or by the terminal, and the control unit 75 checks according to the source that transmitted the message that the message class in the message is correct. Alternatively, the control unit 75 adds a filtering parameter (message class) to the headers of the message to be transmitted. If there is reason to doubt the correspondence between the message class and the content of the message, the control unit may control the message to be returned to the sender. The control unit 75 sees the source of the message from a so-called A subscriber ID, which is included in the message if the source is a terminal of a telephone network. If the message originates from a server, the ID of the source can be, e.g. an IP address (which is not necessarily a reliable identification, however).

In addition to the classes presented above, there could be a class for the information that could not have been verified, whereupon, e.g. the MM-SC could add to the electronic information to be delivered to the terminal, a class information "Unreliable Source" or similar. This class could be useful particularly for information originating from the Internet (a web server).

This paper presents the implementation and embodiments of the present invention with the help of examples. A person skilled in the art will appreciate that the present invention is not restricted to details of the embodiments presented above, and that the invention can also be implemented in another form without deviating from the characteristics of the invention. The embodiments presented above should be considered illustrative, but not restricting. Thus, the possibilities of implementing and using the invention are only restricted by the enclosed claims. Consequently, the various options of implementing the invention as determined by the claims, including the equivalent implementations, also belong to the scope of the invention.

The invention claimed is:

1. A method comprising:
associating by a network element a specific filtering parameter to a multimedia message, the filtering parameter classifying a type of the multimedia message
transferring by a network element the filtering parameter to a terminal in a first notification through a telecommunication connection, the first notification being transmitted separately from the multimedia message;
the terminal determining from the filtering parameter whether the multimedia message is to be transferred to the terminal;
in response to said terminal allowing a transfer of the multimedia message to the terminal, transferring by the network element the multimedia message to the terminal through the telecommunication connection;
in response to said terminal not allowing the transfer of the multimedia message to the terminal, preventing by the terminal the transfer of the multimedia message to the terminal through the telecommunication connection.

2. A method according to claim 1, wherein the telecommunication connection is a wireless connection.

3. A method according to claim 1, wherein said filtering parameter is sent by the network element to the terminal in a notification message to be transmitted separately and the multimedia message is subsequently transferred separately to the terminal by the network element only if the terminal allows the transfer of the multimedia message to the terminal.

4. A method according to claim 1, wherein the multimedia message comprises a header part and a base part, and said filtering parameter is included in the header part of the multimedia message and that in the method the filtering parameter of said header part is first sent to the terminal by the network element; and the base part of the multimedia message is sent to the terminal by the network element only if the terminal allows the transfer of the multimedia message to the terminal.

5. A method according to claim 1, wherein said filtering parameter comprises the information on at least one class of a number of predetermined classes, on the basis of which the multimedia message has been classified into said class.

6. A method according to claim 5, wherein said class denotes whether the multimedia message is one of the following: a personal message, a commercial advertisement and information relating to a specific subject.

7. A method according to claim 1, wherein said filtering parameter comprises information for identifying an original source of the multimedia message.

8. A method according to claim 1, wherein said filtering parameter comprises information for identifying a content of the multimedia message.

9. A method according to claim 1 further comprising forming by the network element a header of a data unit conformant to a WAP protocol and including by the network element the filtering parameter in said header.

10. A method according to claim 1, wherein the filtering parameter comprises a classification parameter that identifies the multimedia message by a type that is not in a format of the multimedia message.

11. A method according to claim 1, further comprising that the filtering parameter comprises a combination of a classification parameter and a source of the multimedia message and wherein the terminal is further configured to:
determine if the classification parameter indicates whether the transfer of the multimedia message to the terminal is to be allowed or rejected; and
if the classification parameter indicates that the transfer of the multimedia message to the terminal is to be rejected determining, if the source of the multimedia message indicates that the terminal can allow the transfer of the multimedia message to the terminal.

12. A method comprising:
associating by a network element a specific filtering parameter to a multimedia message addressed to a recipient;
transferring by the network element the specific filtering parameter to a terminal of the recipient over a telecommunication connection so as to enable filtering by the terminal the multimedia message before the multimedia message is transferred to the terminal through the telecommunication connection;
wherein the filtering parameter is configured to automatically allow the terminal to either prevent or allow a transfer of the multimedia message to the terminal over the telecommunication connection on the basis of said filtering parameter.

13. A method according to claim 12, further comprising waiting by the network element for a response from the terminal to allow the transfer of the multimedia message or prevent the transfer of the multimedia message.

14. A method according to claim 13, further comprising transmitting by the network element the multimedia message through the telecommunication connection to a terminal if the response is positive or if no negative response is received.

15. A method according to claim 12, further comprising:
informing by the network element the terminal through the telecommunication connection to check the filtering parameter before the multimedia message is transferred to the terminal.

16. A method according to claim 12, wherein said filtering parameter comprises information on at least one class of a number of predetermined classes, on the basis of which the multimedia message has been classified into said class.

17. A method according to claim 16, wherein said filtering parameter further comprises information for identifying an original source of the multimedia message.

18. A method according to claim 17, wherein the filtering parameter further comprises information for identifying a content of the multimedia message.

19. A method according to claim 16, wherein said filtering parameter further comprises information for identifying a content of the multimedia message.

20. A method according to claim 16, wherein said at least one class denotes whether the multimedia message is one of the following: a personal message, a commercial advertisement and information relating to a specific subject.

21. A method comprising:
associating by a network element a specific filtering parameter to a multimedia message addressed to a recipient;
transferring by the network element the specific filtering parameter to a terminal of the recipient over a telecommunication connection so as to enable filtering by the terminal the multimedia message before the multimedia message is transferred to a terminal through a telecommunication connection;
wherein the filtering parameter is configured to allow the terminal to either prevent or allow a transfer of the multimedia message to the terminal over the telecommunication connection on the basis of the filtering parameter; and
wherein the filtering parameter comprises information on at least one class of a number of predetermined classes, on the basis of which the multimedia message has been classified into the class, the class denoting whether the multimedia message is a personal message, a commercial advertisement or information relating to a specific subject.

22. A method according to claim 21, further comprising informing the terminal through the telecommunication connection to check the filtering parameter before the multimedia message is transferred to the terminal.

* * * * *